Patented Feb. 25, 1941

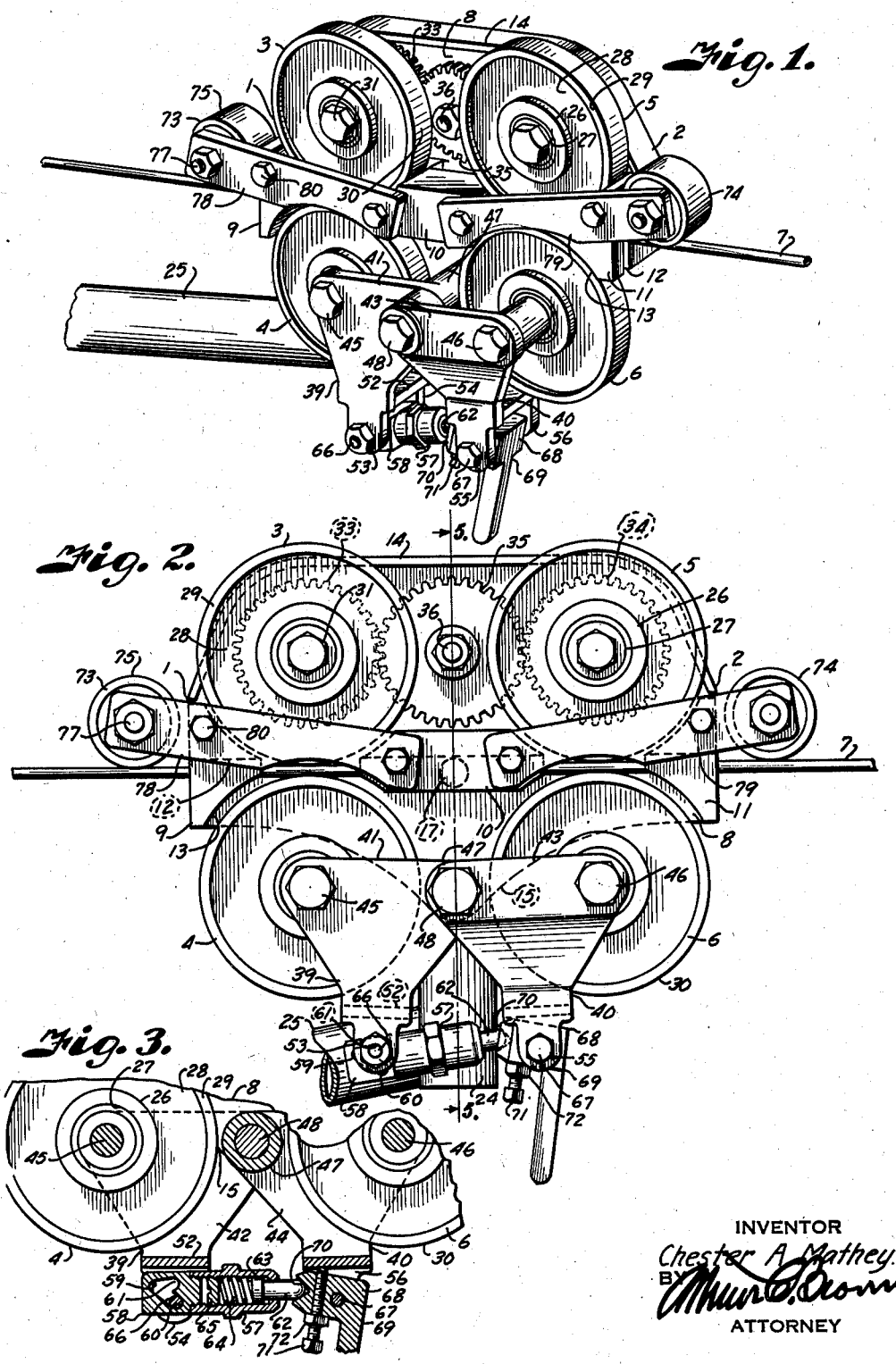

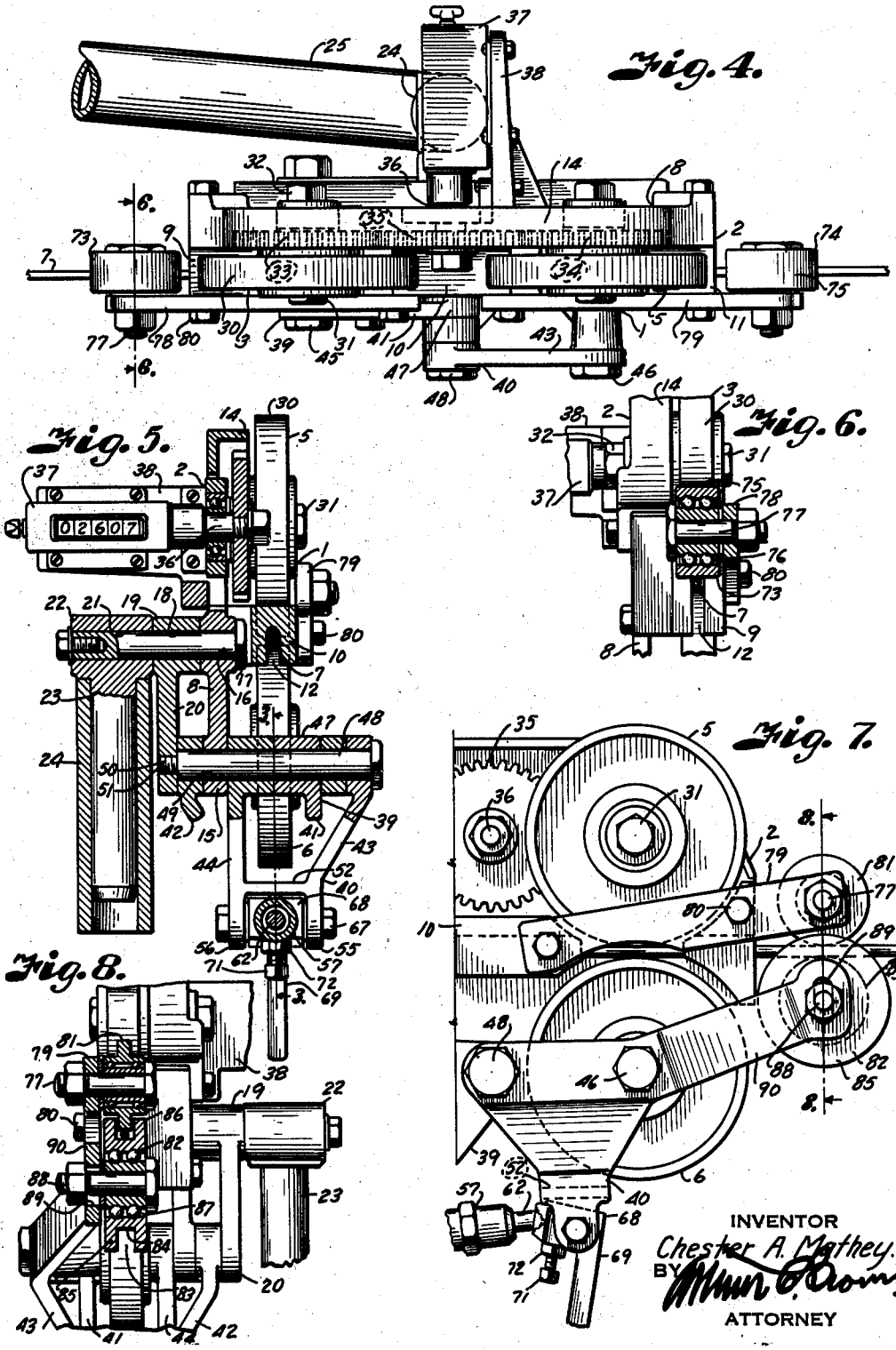

2,232,956

UNITED STATES PATENT OFFICE 2,232,956

MEASURE METER

Chester A. Mathey, Tulsa, Okla.

Application October 17, 1938, Serial No. 235,417

4 Claims. (Cl. 33—134)

This invention relates to measure meters, and particularly those for measuring length of cable paid therethrough, for example, in determining the depth or locations in a well or other borehole. In devices of this character any variation in extent of contact of the cable with the traction member, or flexure of the cable at the point of measure, results in inaccuracy of measurement.

It is, therefore, the principal object of the present invention to provide a measure meter wherein contact of the cable with the traction member of the metering mechanism is kept constant and wherein the cable is kept from flexing at the points of contact.

It is also an object of the invention to provide an improved toggle and latching mechanism for clamping the measure meter on the cable.

A further object of the invention is to provide a measure meter that will operate accurately on different size cables, for example, a relatively small torpedo line or a larger shell line.

In accomplishing these and other objects of the invention, as hereinafter pointed out, I have provided improved details of structure, the preferred forms of which are illustrated in the accompanying drawings, wherein:

Fig. 1 is a perspective view of a measure meter constructed in accordance with the present invention and illustrating it in operation for measuring the length of cable paid therethrough.

Fig. 2 is a side elevational view of the measure meter.

Fig. 3 is a fragmentary section through the measure meter on the line 3—3 of Fig. 5.

Fig. 4 is a plan view of the measure meter.

Fig. 5 is a vertical section on the line 5—5 of Fig. 2.

Fig. 6 is a fragmentary section on the line 6—6 of Fig. 4, particularly illustrating journalling of the cable guide wheels.

Fig. 7 is a side elevational view of a measure meter embodying the modified form of the invention.

Fig. 8 is a section on the line 8—8 of Fig. 7.

Referring more in detail to the drawings:

1 designates a measure meter of the type illustrated and described in Patent No. 2,060,233, issued to myself and Paul F. Lewis and dated November 10, 1936, but which is equipped with improvements embodied in the present invention.

The measure meter includes a frame 2 which carries cable traction members in the form of paired wheels 3—4 and 5—6 adapted to operate upon a cable 7, for example, a shell or torpedo line paid between the wheels of the respective pairs. The frame 2 includes a substantially plate-like member 8 provided with laterally extending spaced lugs 9, 10 and 11, having slots 12 opening in the direction of the wheels 4 and 6 for passing the cable or line 7. The adjacent sides of the respective lugs are cut away in arcuate curves 13 to accommodate the peripheries of the respective wheels. The upper part of the plate-like member also has a laterally extending flange 14 which forms a housing for the gears of the metering mechanism later described. The opposite side of the plate-like portion of the member 8 terminates in a central ear 15 to which is pivotally mounted the toggle portion of the frame carrying the wheels 4 and 6 which form cable backing wheels to maintain contact of the cable with the wheels 3 and 5.

The plate member 8 has a bearing opening 16 registering with a recess formed in the lug 10 to pass a pivot member, such as a bolt 17, that also extends through an opening 18 in a hub 19 of an arm 20 that cooperates with the ear 15 in supporting the toggle portion of the frame. The pivot member 17 extends through a registering bore 21 in the head 22 of a dolly pin 23, the dolly pin being journalled within a bearing sleeve 24 on the end of a supporting arm 25. It is thus obvious that the meter measure frame is adapted to rock about the axis of the pivot member 17 and to swing laterally about the axis of the dolly pin 23 so as to automatically adjust itself to directional feed of the cable 7.

The measuring wheels include hubs 26 having anti-friction bearings 27, and extending radially from the hubs are webs 28 carrying rims 29, having flat, annular faces 30 adapted to contact the cable 7. The circumference of the wheel faces corresponds to a standard unit of measure, for example, one foot, so that for each revolution of the respective wheels one foot of cable has passed therethrough.

The wheels 3 and 5 have fixed, journalled mounting on the plate member 8 by means of fastening devices, such as bolts 31, extending therethrough and securely retained by nuts 32. Connected with the hub portions of the wheels 3 and 5 are gears 33 and 34 meshing with an intermediate gear 35 that is fixed on a shaft 36 of a registering device 37 for registering the number of revolutions imparted to the wheels 3 and 5, the registering device 37 being supported on an arm 38 extending laterally from the plate member on the side opposite to the measuring wheels.

The toggle part of the supporting frame carries the wheels 4 and 6 and includes bell crank levers 39 and 40 having yoke-shaped arms 41–42 and 43–44 respectively that are spaced apart to accommodate the wheels 4 and 6 therebetween and which are mounted on spindles 45 and 46 extending through the antifriction bearings of the wheels and through the respective arms. The arms of the respective bell crank members have interengaging hub portions 47 pivotally mounted on a supporting pin 48 which extends therethrough and through an opening 49 in the ear 15, the hub of the inner arm of the bell crank 39 being supported on the pivot pin 48 between the arm 20 and the ear 15 to more rigidly brace the bell cranks and support the peripheral faces of the wheels 4 and 6 in parallel relation with the corresponding faces of the wheels 3 and 5.

The inner end of the pin 48 has a reduced threaded shank 50 engaged within a registering threaded opening 51 in the arm 20, as best shown in Fig. 5. The arms of the bell cranks are also connected by webs 52 having spaced ears 53–54 and 55–56 for supporting a latching toggle, including a sleeve 57 that is threadedly supported on a head 58 which is provided with a transverse opening 59 having a spaced pin selectively engageable with a seat 60 or 61 located respectively at different distances from the end of the sleeve 57.

Slidably supported in the sleeve is a plunger 62 having a head 63 guidingly mounted in the sleeve, and which is engaged by a coil spring 64 housed within the sleeve and having its opposite end bearing against an adjusting plug 65 for regulating tension of the spring. The head 58 is retained between the ears 53 and 54 by a pin 66 extending through the slot 59 and through the ears. Pivoted on a similar pin 67 carried by the ears 55 and 56 is a head 68 of an actuating lever 69. The head 68 has a socketed face 70 for engaging the plunger 62. Threadedly supported in the head is a set-screw 71 adapted to bear against the web 52 of the bell crank 40 to adjust off center position of the head of the lever relatively to the plunger 62, the set-screw being retained in a selected, adjusted position by a lock nut 72.

With the structure thus far described, it is obvious that when the lever is swung in the direction of the wheel 6, the plunger 62 moves out of engagement with the socket in the lever head so that the wheels 4 and 6 may swing toward each other about the axis of the pivot pin 48 and away from the wheels 3 and 5 to permit threading of the line 7 into the slots or grooves 12, so that the measure meter may be readily applied to the line. When applied, the wheels 4 and 6 are moved into engagement with the line to clamp the line against the peripheral faces of the wheels 3 and 5. The member carrying the plunger is then adjusted relatively to the lever so that the plunger 62 thereof moves into the seat of the lever head whereupon the lever is moved downwardly to compress the spring 64 until the plunger has passed off center position relative to the pivot pin 67, whereupon the spring 64 comes into play to hold the lever in position and to exert pressure of the wheels 4 and 6 against the line, the set-screw 71 having been adjusted to provide the desired off center position of the lever relative to the plunger.

With the structure thus far described, and with the line extending in a straight path directly between the wheels, the wheels have single point or tangential contact with the line and the measure meter will record accurately. However, should there be a deflection in the line which would cause the line to effect greater contact with the measuring wheels, this additional contact and flexure in the line affects the accuracy of the measurement, and to maintain the desired tangential or point contact of the line, I provide guide wheels 73 and 74 having flat peripheral faces 75 adapted to contact the line in exactly the same plane as the contact points of the wheels 3 and 5. The guide wheels 73 and 74 have anti-friction bearings 76 which are carried on pins or bolts 77 supported in the ends of arms 78 and 79. The arms 78 and 79 are mounted on the respective lugs 9, 10 and 11 by fastening devices, such as cap-screws 80 extending through suitable openings in the arms and into threaded sockets in the lugs, the arms being positioned at a suitable angle to support the wheels in the position above noted, and as shown in the drawings.

With use of the guide wheels, it is clearly obvious that the contact points of the line with the measure wheels will be kept in a common plane coincident with opposite diametrical sides of the line. Therefore, the measuring wheels are kept in tangential single point contact with the line so that the portions of the line passing between the wheels is accurately measured and recorded on the metering device.

Should a splice or deformation cause one of the wheels to slip while engaging the deformity, the other wheel will be moving on an undeformed portion of the line so as to transmit measuring movement of the wheel through the gearing to the metering device.

The form of the invention shown in Fig. 7 is similar to that of the preferred form with the exception that the guide wheels have relatively narrow, peripheral faces 81 which contact with the cable being measured. On the opposite side of the line are cooperating wheels 82 having peripheral grooves 83, the bottom faces 84 of the grooves 83 engaging the wire which is retained in alignment with the faces 81 by flanges 85 and 86 of the cooperating wheels as clearly shown in Fig. 8. The cooperating wheels are mounted on anti-friction bearings 87 carried on fastening devices, such as bolts 88, having their shanks extending through slots 89 in the ends of the arms 90 extending upwardly and outwardly from the respective bell cranks as clearly shown in Fig. 7. With this arrangement the wheels 82 may be adjusted so that the bottom faces of the grooves align with the plane of the peripheral faces of the wheels 4 and 6, as shown in Fig. 7, this adjustment being necessary when the measuring meter is used on lines of different diameter.

In using a measure meter constructed as shown in Figs. 1 to 6 inclusive, the latching lever controlling the bell cranks is moved to position to permit the wheels 4 and 6 to move away from the wheels 3 and 5 so that the line may be passed therebetween and moved into the slots 12 of the lugs 9, 10 and 11. The wheels 4 and 6 are then moved into contact with the line and yieldingly retained thereagainst by manipulation of the latch lever which locks the bell cranks so that the peripheries of the wheels 4 and 6 are kept in yielding contact with the line. When the measure meter is thus applied, the line may flex relatively to the guide wheels 73 and 74 but that portion of the line between the respective guide wheels is kept in a linear condition so that the contact portion of the traction wheels remain constant and when one foot of line is moved therebetween the wheels have made one revolution to effect the recordation of one foot on the recorder 37. Should a splice or deformity pass under the guide wheel on the inlet side of the measure meter, the lower wheel 4 will move correspondingly against tension of the spring 64, however, while this movement is taking place the pairs of measuring wheels 5 and 6 maintain their required contact with the line 7 so that there is no disruption in actuation of the recorder. As soon as the deformity passes the wheels 3 and 4 they return to their normal position relatively to the line to continue measurement as the deformity moves between the wheels 5 and 6.

The form of the invention shown in Fig. 7 operates in exactly the same manner.

When it is desired to use the measure meter on a larger line, the seat 61 of the toggle latch is disengaged with the pin 66 and the seat 60 is moved in engagement with the pin so that the tension of the spring 64 remains substantially the same for the larger sized line. When this adjustment is made, it would possibly be necessary to adjust the set-screw of the latch lever.

When the form of the invention shown in Fig. 7 is used on a larger line, it would be necessary to adjust the position of the cooperating wheels 82 by adjusting the spindles thereof in the slots 89 so that the contacting faces thereof may be kept in the same plane as the contacting faces of the wheels 4 and 6.

From the foregoing it is obvious that I have provided a measure meter which will accurately record the length of a line fed therethrough and that the measure meter will operate accurately in either direction incidental to the relative positions of the guide wheels.

What I claim and desire to secure by Letters Patent is:

1. A measure meter including a frame, cable measuring means, spaced guides having fixed positional support on the frame and adapted to contact a cable to be measured whereby the portion of the cable operating between said guides is retained in a straight path and from deflection in the direction of said cable measuring means regardless of variation in angular diversion of the cable passing to and from the respective guides, means supporting said measuring means in fixed position on the frame and in contact with the portion of said cable moving through said path, backing wheels contacting the cable on a side thereof opposite the measuring means, bell crank toggle levers movably supporting said backing wheels on the frame for movement to and from said measuring means, toggle means connecting said bell cranks including a spring pressed member having spaced seats and a pin on one of the bell crank levers selectively engageable with one of said seats whereby said toggle means is adjustable to different sized cables, and a toggle actuating lever having a seat for engaging the spring pressed member.

2. A measure meter including a frame, spaced guides having fixed positional support on the frame and adapted to contact a cable to be measured whereby the portion of the cable operating between said guides is retained for movement in a straight path between said guides, cable measuring means, means supporting said measuring means in fixed position on the frame and in contact with the portion of said cable moving through said path, backing wheels contacting the cable on a side opposite the measuring means, bell crank toggle levers pivoted on the frame and carrying said backing wheels for swinging movement to and from said measuring means, guide wheels on said bell crank levers for retaining the cable against said guides, toggle means connecting said bell cranks to effect pivotal movement of said bell cranks including a spring pressed member having an adjustable connection with one of the bell crank levers whereby said toggle means is adjustable to different sized cables, and a toggle actuating lever having a seat for engaging the spring pressed member.

3. A measure meter including a frame, a support for the frame, cable measuring wheels, guide wheels having fixed positional support at spaced points on the frame and adapted to contact a cable to be measured whereby the portion of the cable operating between said guide wheels is retained in a straight path and from deflection in the direction of the measuring wheels during variation in angular diversion of the cable passing to and from the respective guide wheels, means rotatably supporting said measuring wheels in fixed position on the frame between said guide wheels and in contact with the portion of said cable moving through said path, backing wheels, means movably supporting said backing wheels on the frame for movement to and from contact with said portion of the cable moving through the path fixed by said guide wheels, and idler wheels carried by said movable supporting means and adapted to contact the cable at points substantially opposite said guide wheels to retain the cable in contact with said guide wheels, said idler wheels being movable into and out of contact with the cable synchronously with said backing wheels.

4. A measure meter including a frame, a support for the frame, cable measuring means, guide wheels having fixed positional support on the frame and adapted to contact a cable to be measured whereby the portion of the cable operating between said guide wheels is retained in a straight path and from deflection in the direction of the cable measuring means regardless of variation in angular diversion of the cable passing to and from the respective guide wheels, means supporting said cable measuring means on the frame in contact with the portion of said cable moving through said definite path, backing wheels contacting the cable on the side thereof opposite the cable measuring means, means movably supporting said backing wheels on the frame for movement to and from contact with said portion of the cable contacted by the measuring means, idler wheels carried upon said movable supporting means in spaced relation to the backing wheels to contact the cable at points substantially opposite the guide wheels and to retain the cable against said guide wheels, and toggle means connecting said movable supporting means for retaining said backing and idler wheels from movement away from the cable during measuring of the cable and for synchronously shifting the backing and idler wheels away from contact with the cable.

CHESTER A. MATHEY.